(12) United States Patent
Heutschi et al.

(10) Patent No.: US 9,226,148 B2
(45) Date of Patent: Dec. 29, 2015

(54) ACCESS METHOD IN A WLAN FOR AN IP MOBILE TELEPHONE WITH AUTHENTICATION BY MEANS OF AN HLR

(75) Inventors: Walter Heutschi, Jegenstorf (CH); Toni Stadelmann, Bolligen (CH); Peter Zbaeren, Kaufdorf (CH)

(73) Assignee: TOGEWA HOLDING AG, Bern (CH)

( * ) Notice: Subject to any disclaimer, the term of this patent is extended or adjusted under 35 U.S.C. 154(b) by 1667 days.

(21) Appl. No.: 11/574,984

(22) PCT Filed: Dec. 9, 2004

(86) PCT No.: PCT/EP2004/053383
§ 371 (c)(1),
(2), (4) Date: Mar. 9, 2007

(87) PCT Pub. No.: WO2006/061049
PCT Pub. Date: Jun. 15, 2006

(65) Prior Publication Data
US 2007/0268889 A1 Nov. 22, 2007

(51) Int. Cl.
*H04W 12/06* (2009.01)
*H04M 11/00* (2006.01)
*H04L 29/12* (2006.01)
*H04L 29/06* (2006.01)
*H04W 4/24* (2009.01)
*H04W 80/04* (2009.01)
*H04W 80/10* (2009.01)

(52) U.S. Cl.
CPC ......... *H04W 12/06* (2013.01); *H04L 29/12188* (2013.01); *H04L 61/1588* (2013.01); *H04L 63/0853* (2013.01); *H04M 11/00* (2013.01); *H04W 4/24* (2013.01); *H04W 80/04* (2013.01); *H04W 80/10* (2013.01)

(58) Field of Classification Search
None
See application file for complete search history.

(56) References Cited

U.S. PATENT DOCUMENTS

| 6,856,799 | B1 * | 2/2005 | Ritter ............................. 455/402 |
| 7,110,764 | B1 * | 9/2006 | Blair et al. .................... 455/436 |
| 7,296,152 | B1 * | 11/2007 | MacPherson et al. ........ 713/168 |
| 7,539,309 | B2 * | 5/2009 | Stadelmann et al. ......... 380/270 |
| 2005/0177733 | A1 * | 8/2005 | Stadelmann et al. ......... 713/185 |
| 2009/0247120 | A1 * | 10/2009 | Heutschi et al. .............. 455/406 |

FOREIGN PATENT DOCUMENTS

| WO | 2004/017564 | 2/2004 |
| WO | 2004/017565 | 2/2004 |

OTHER PUBLICATIONS

U.S. Appl. No. 12/280,655, filed Aug. 25, 2008, Heutschi, et al.
U.S. Appl. No. 13/479,020, filed May 23, 2012, Heutschi, et al.

* cited by examiner

*Primary Examiner* — Jae Y Lee
*Assistant Examiner* — Aixa Guadalupe-Cruz
(74) *Attorney, Agent, or Firm* — Oblon, McClelland, Maier & Neustadt, L.L.P.

(57) ABSTRACT

The invention relates to a method and a system for IP-based telephony and video conferencing between at least one IP node (10) and a second terminal (30/31). According to said method, authentication data is transmitted from an identification module (11) of the IP nodes (10) and registration data is transmitted to a registration module (51). The IP node (10) is authenticated using an authentication module (20) and a home location registry (25). Corresponding location data is stored in the location database and is forwarded to the identification module (11) of the IP node (10). Said IP node (10) is then released for IP based telephony or video telephony.

17 Claims, 2 Drawing Sheets

Figure 1:
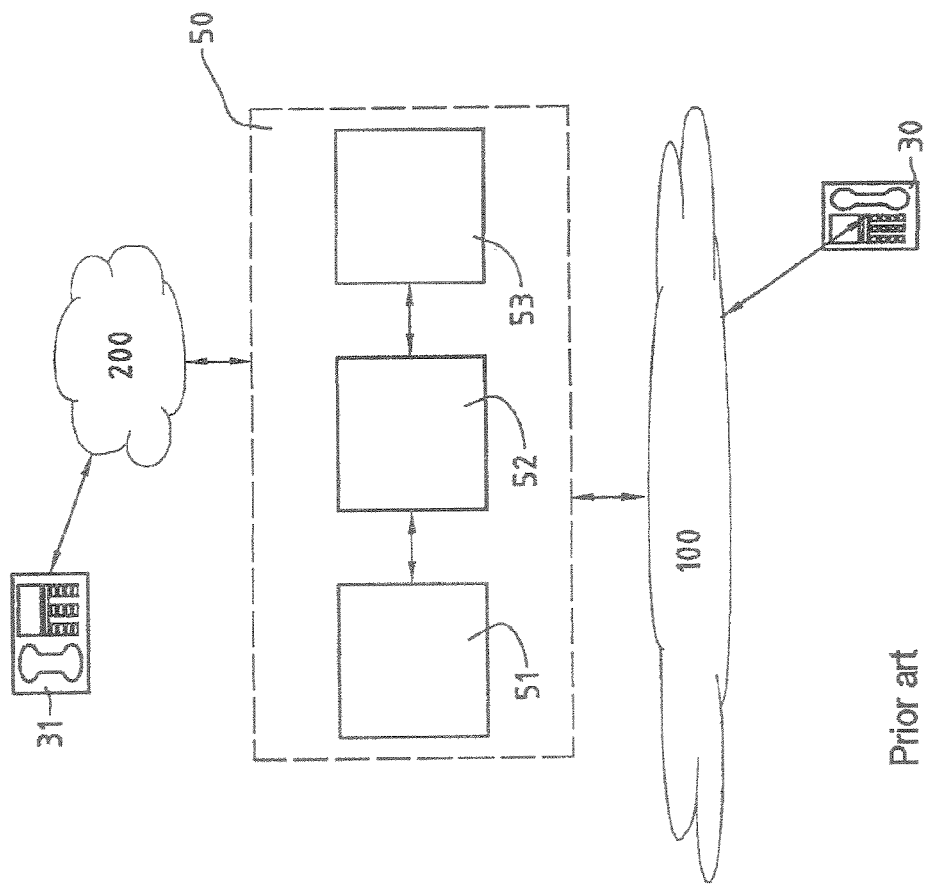

ACCESS METHOD IN A WLAN FOR AN IP MOBILE TELEPHONE WITH AUTHENTICATION BY MEANS OF AN HLR

The present invention relates to a method and a system for IP-based telephony and video telephony, in which IP nodes are authenticated on the basis of authentication data by, an identification module before registration in the IP-based network.

IP-based telephony is a technology which has been developed in recent years to form a real alternative to conventional voice transmission in line-switching telephony networks. While conventional telephone calls are transmitted as a continuous data stream via a telephone network, speech data in the case of IP-based telephony is broken down into packets, which are transmitted individually via a data network. After breaking down large amounts of acoustic information and transmission via the network, these small packets are reassembled at the reception end. This allows telephony services to be co-located with the data network so that there is no need for installation and maintenance of a separate telephone network, since IP-based telephones are connected to a data network via an appropriate interface, and can transmit voice data by means of appropriate network protocols. A further important advantage of IP-based telephone communication over conventional telephony is the range of new services which are being made possible for the first time by IP-based technology and represent added value in comparison to conventional telephony. Inter alia, IP-based telephony offers automatic encryption of voice communication, thus all owing calls which are proof against monitoring. This development of IP-based telephony has also had an influence on the parallel development of IP-based vide telephony as an alternative to conventional video conference technology. Nowadays ever faster data links are allowing simultaneous transmission of video and audio of excellent quality. In the case of IP-based video telephony, voice data and video data are broken down into packets once again in the same way as in the case of IP-based telephony, are sent via an IP-based network, and are reassembled at the receiver.

At the same time, the amazing development of wire-free data networks (WLAN 802.11, Bluetooth etc.) and an increasing number of so-called hotspots in the public area (for example in airports, train stations, conference centers, and exhibition sites as well as places where people gather in cities) have led to IP-compatible appliances now having the capability for mobility which is comparable only to the present-day mobile radio networks (GSM, UMTS etc. Wire-free access to services such as the Internet is now already a matter of course. Furthermore, IP-based mobile telephones have also been offered for some time, which allow mobile IP-based telephony via a local wire-free network. These mobile IP telephones already exist in embodiments with integrated cameras as well, so that mobile IP-based video telephony is itself becoming feasible.

In order to set up communication and interchange data in telephony and/or image telephony networks, all of the network components must comply with specific standards, which are defined in protocols and protocol families. By way of example, the E-DSS1 (Euro-ISDN) protocol for line-switching telephony networks, and the H.323, SIP, MEGACO and MGCP protocol for IP-based telephony and/or video telephony are known from the prior art.

One of the most frequently used protocols for IP-based telephony and/or video telephony is the Session Initiation Protocol (SIP, IETF RFC 3261, previously RFC 2543). This was specified for the first time in 1999 by the Internet Engineering Task Force (IETF) This network protocol has a very simple structure and is heavily based on the HTTP (Hypertext Transfer Protocol). This allows a communication session to be set up between two or more subscribers. However, this is a pure initialization protocol. For data interchange, SIP-based telephony and/or video telephony systems use other protocols, in particular SDP (Session Description Protocol, IETF RFC 2327) and the RTP (Realtime Transport Protocol, IETF RFC 1889). SDP is used in particular to handle the audio and/or video codecs, transport protocols etc. to be used between the end points. The object of RTP is to transport the multimedia data stream (audio, video, text etc.), that is to say to code the data, to break it down into packets, and to send it. Communication end points in an SIP-based system are referred to as user agents. A user agent client (UAC) is a component which initiates an SIP request, and the user agent server (UAS) acknowledges this request with a response. A user agent (UA) can assume not only the role of the UAC but also that of the UAS. Requests, of which a limited number are given, are in principle acknowledged by responses (about a hundred different responses). These are distinguished only by numbers. A user agent sends an SIP message to an SIP proxy in advance. The proxy uses the stated address to decide where it must send the message to, and passes it on. These proxies can in principle be stateless or stateful. While stateless proxies only pass on messages and actually are not aware, that for example, a call is being set up, stateful proxies can accept tasks which are helpful in setting up a call. One of the most important tasks of a stateful proxy is the distribution of calls to different destinations: in the case of so-called "sequential forking", the possible call destinations are dialed successively, while in the case of "parallel forking", all of the destinations receive a message at the same time. A further essential component of an SIP-based system is an SIP register, in which all of the user agents must register. This logic unit maintains a databank with information about the registered user agents, and diverts requests to these destinations. The register and proxy are generally the same program which controls the diversion process internally, without any need to interchange messages. Finally, an SIP-based system also has a redirect server or gateway which, inter alia, ensures the connection between the IP-based telephony network and the PSTN.

SIP uses the register method for registration. The UA indicates where it can be accessed and receives the confirmation with the code 200 (OK). If the user is not known, 404 (not found) is sent back, and if the registration is not allowed, the response is 403 (forbidden). However, the precondition for successful registration is successful authentication of the user agent in the corresponding network, and the check of its authorization for desired services. For this purpose authentication and authorization methods for RADIUS and/or DIAMETER are generally used for this purpose in an SIP-based environment, and these are also used for many other network functions.

The authentication protocol RADIUS (Remote Authentication Dial-In User Service—IETF RFC 2138, 2868) is nowadays used in many network units, such as routers, modem servers, switches etc. The authentication client sends its user name and its password to the RADIUS Server. The RADIUS server checks this information and authorizes the user to use the system. One basis for the widespread use of RADIUS, inter alia, is that network units can in general not handle a vary large number of network users, each having different authentication information, since, for example, this would exceed the memory capacity of the individual network units. RADIUS allows central administration of a large number of network users (addition, deletion of users etc.). By way of example, this is a necessary precondition for the use of their service in the case of ISP (Internet Service Providers), since the numbers of their users frequently comprise several thousand to several tens of thousands of users. RADIUS also provides a certain amount of permanent protection against hackers. The remote authentication of RADIUS is based on TACACS+ (Terminal Access Controller Access Control System+) and LDAP (Lightweight Directory Access Protocol) and is relatively secure against hackers. In contrast, a large number of other remote authentication protocols provide protection against hacker attacks only at times, inadequately, or not at all. Another advantage of RADIUS is the fact that RADIUS was the de-facto standard for remote authentication for a long time, so that RADIUS is also supported by virtually all systems.

However, with the increasing complexity of the services required, RADIUS has been found to be unsuitable for use in relatively large networks. This has made it necessary to develop a new protocol. The Diameter Protocol (IETF RFC 3588) has, however, not been developed as a completely new protocol, but the majority of it was obtained from the RADIUS protocol, and overcomes its faults. Like RADIUS, Diameter uses attribute/value pairs (AVP) for the transmission of data and UDP as the transport protocol. Furthermore, it can be upgraded by the addition of new instructions and AVPs. This represents a basic protocol which satisfies the minimum requirements for an authentication transport protocol. It is therefore not intended to be used on its own, but should always be used with an application-specific extension. Diameter is a peer-to-peer protocol. The Diameter client normally initiates an authentication or authorization request from a user. The Diameter server receives this requests and either responds to it or passes it to a proxy server. The mobile node requests the desired service by means of the authentication request message (AMR), which contains the AVPs. The information which is required for authentication is extracted from this message, and is included in Diameter AVPs. This message is passed on to the local Diameter server, which is referred to as AAAF. The AAAF passes the message to the authentication home server (AAAH). If the AAAH can successfully authenticate the user, it sends a home agent MIP request (HAR) to a home agent. After receiving the HAR, this home agent first of all processes the Diameter message, and then creates the HAA response with the required data, such as the session ID etc., and sends this to the AAAH. This creates the authentication response (AMA) which, inter alia, contains information for the tunneling of messages, and sends this AAAF. The link is thus set up. The mobile IP extension furthermore defines numerous special cases, such as the handling of handoffs.

In addition to the authentication and authorization, another question which arises in a network for IP-based telephony and/or video telephony is suitable billing mechanisms. The TAP protocol (Transferred Account Procedure) from the Transferred Account Data Interchange Group (TADIG) in the GSM consortium is protocol which is known from the prior art for billing for the service demanded by mobile units in GSM networks. One very important concept in GSM networks is roaming, a method which allows a user of a mobile radio to use his mobile radio not only in his original network but in any other desired network, at home or abroad. However, this method requires a billing concept which can cope with the complexity of the protocols and the various services offered without any errors. The billing methods for GSM networks are therefore in no way trivial. More than 400 GSM networks are in use throughout the world at the moment, and it is estimated that more than 20,000 individual roaming agreements exist for this purpose between the individual network operators. In consequence, in order to allow billing, the apparently simple idea of roaming conceals an extremely complex process of information gathering, information distribution and information evaluation. In this context, the Transferred Account Procedure Protocol (TAP) is used to interchange roaming billing information between the individual mobile radio network service providers. On Jun. 4, 2000, TAP3 was finally launched, following TAP2 and TAP2+. Sub-versions TAP3.1 and TAP3.2 already exist. TAP3 can now be referred to as the standard, even though TAP is a protocol which is being developed further.

Most voice or data traffic in GSM networks comes from or ends in a different network than the mobile user at the time. The operator or a local network raises charges for each call which ends with one of its users, irrespective of whether this is a landline network or a mobile radio network. In order to simplify the raising of charges, the local fixed network operators have reached mutual agreements with the local mobile radio network operators. A mobile radio network operator in one country therefore need not reach an agreement with a landline network operator in a different country in order to allow billing for a call from the mobile radio network of the first provider to the landline network of the second provider. Normally, the landline network provider in the first country will already have an agreement with the landline network operator in the second country relating to the type of billing and the charges, so that the mobile radio network operator in the first country can then bill his services via the landline network provider, with a corresponding agreement. The costs are normally billed either directly (retail billing) or via a service provider (wholesale billing) to the user. The type of billing for roaming data traffic or voice traffic between different mobile radio networks (PMN: Public Mobile Network) is achieved by means of the TAP protocol. Roaming call records are typically created either as TAP records or as CIBER (Cellular Intercarrier Billing Exchange Roamer) records. CIBER records are used by mobile radio network operators who are operating using AMPS-based technologies, such as AMPS, IS-136 TDMA and IS-95 CDMA. TAP is used primarily by GSM/UMTS mobile radio network service providers, and is the main protocol for billing in GSM/UMTS-dominated regions.

Details of a call by a user who is located in a visited network (VPMN: Visited Public Mobile Network) are registered in a mobile switching center (MSC) for their network. Each call thus produces one or more call records. The GSM Standard for these records is defined in GSM 12.05, although many providers use their own formats. The MSC call records are transmitted to a VPMN billing system for billing. These call records are then converted to the TAP format, and are associated with the appropriate user. The TAP records are sent to the appropriate mobile radio network service provider at the latest within a predefined time (for example 36 hours). The TAP files additionally contain information relating to the provider service tariff (IOT: Inter Operator Tariff) and all further bilateral agreements and payment schemes. The TAP records are sent directly or normally via a billing center, for example a clearing house. When the home network operator (HPMN: Home Public Mobile Network) receives as TAP record from the VPMN, this is converted to an appropriate internal format and is billed together with the normal call records or that user, which it produces in the home network. In the case of wholesale billing, in which a service provider bills the user with the costs incurred, the HPMN passes the records on to the service provider which, in particular, can also issue bills for the calls on the basis of its own tariffs from new, and produces the bill, for example with call details, for that user.

TAP3 supports a large number of services. TAP3 is now used for billing between GSM/UMTS service providers and GSM/UMTS service providers, GSM/UMTS service providers and non-GSM service providers (inter-standard roaming) and GSM service providers and satellite service providers/ etc. The three fundamental service categories of voice, fax and so-called supplementary services are already supported by TAP1. Billing for the short message service (SMS) is in contrast less trivial owing to the use of short message service center (SMS-C) third parties. Billing for SMS is more difficult for the following reasons: 1. A roaming user can receive an SMS (MT-SMS) while roaming. 2. While roaming, a roaming user can send an SMS (MO-SMS) by using the SMS-C of his home network and 3. A roaming user can send an SMS (MO-SMS) while roaming by using the SMS-C of a visited network. Billing for SMS services is therefore supported completely only from TAP2+. Billing for Circuit Switched Data, HSCSD (High Speed Circuit Switched Data) and GPRS (General Packet Radio Service) is also supported from TAP3. TAP3 likewise supports all Value Added Services (VAS), such as the so-called billing for content. However, billing for Value Added Services is frequently difficult since this is dependent on the agreement of the service provider to the billed services. Customised Application Mobile Enhanced Logic (CAMEL) will be supported from the introduction of TAP3.4. CAMEL is particularly important for applications in the case of prepaid services for roaming users and may become increasingly important in the future. Another important application of TAP3 is the support of billing based on the Inter Operator Tariff (IOT). IOT makes it possible for the home network service provider (HPMN) to check special offers and tariffs of a visited service provider (VPMN) and to pass them on to the roaming user. By way of example, the VPMN can give discounts for various call services or levels, and the HPMN can easily verify these, and adapt its tariffs. The capability to bill for roaming services irrespective of where the user is currently located is a valuable aid for mobile network service providers, and prevents the loss of income when discounts are given in the meantime by a VPMN. From TAP3, the TAP protocol likewise includes detailed information about from where precisely a call has been made or a service has been demanded etc., and where it has been passed to. This information helps to create a profile of the respective user based on his behavior, which provides important information in order to adapt and to optimize the range of services to the user requirements. In particular, it can be used to offer specific location based services, such as sporting events or concerts etc. Finally, with the returned accounts procedure (RAP) protocol TAP3 also offers differentiated error handling. For example, RAP allows the HPMN, inter alia, to check incoming TAP files for their validity and conformity with the TAP standard and, if necessary, to partially reject them without bills for services which have been transmitted correctly being lost.

In principle, similar questions to those relating to billing for calls between two different mobile radio network operators must be solved at the interface between IP-based telephony and/or video telephony and the conventional telephony networks. Firstly, there are typically a large number of operators, with respect to whom it can be assumed in practice that each of these operators use their own tariff model. Secondly, a customer of one operator may call any desired customers of other operators and this results in higher call charges. General guidelines for making equalizing payments can be found, for example, in ITU Recommendation D.196. However, no publically accessible standards and protocols exist for a standard procedure for clearing and settlement. Furthermore, a number of providers exist for one clearing house, and in particular may be used by mobile radio operators for billing for roaming charges. All of these providers have the common feature, however, that, once again, no publically accessible standards are used.

In order to allow charging for a call between two providers via a central point, all of the providers must use a standard protocol. The TransNexus company have specified the Open Settlement Protocol (OSP) for this purpose, which has been declared to be a Standard by the ETSI in their TIPHON specification. On the one hand, OSP defines a basic structure for standardized information interchange. On the other hand, the specification also deliberately provides for the capability to replace and/or upgrade parts of the protocol. This likewise allows specific requirements and operator-specific services to be integrated.

A combination of HTTP and S/MIME is used as the transmission protocol for OSP the POST method is used for transmission by HTTP. The PUT method admittedly also exists for data transmission by HTTP to a server. However, the POST method is the only way to assign the data that is also transmitted to a specific server-end resource which carries out the further processing of the data. Furthermore, the content of the transmitted data comprises an S/MIME message. Two operating modes exist for matching OSP messages to a clearing house: the online mode and the bulk mode. In the online mode, a link to the clearing house exists while making a call between the different network operators. The reason for this approach is that some of the tasks for the process of setting up the call can be carried out by the clearing house. If, for example, the backend service associated with the caller has too little information about the destination of the call, the clearing house can make routing decisions and can provide a contact address for the destination gatekeeper. It is also feasible to Integrate the functionality of a service area broker (SAB) in the clearing house. The task of an SAB is to determine the best route for setting up the call, during which process it is possible to take account of time-dependent tariffs and current loads or the networks. The disadvantage of the online mode is, however, an increase in the delay time for setting up a link because, in the end, the caller's gatekeeper not only has to wait for various responses from its own backend server, but in consequence also has to wait for responses from the clearing house. In the bulk mode, in contrast, a link to the clearing house is set up only at predetermine times. One advantage of this method is that a process which is independent of the gatekeeper can read the CDRs from the backend service and can transmit them in bulk to the clearing house. A further advantage in contrast to the online mode is that a temporary failure of the clearing house does not result in any significant disturbances in the specific system. This is because, if a transmit of CDRs is terminated or is not created, then it can easily be repeated at a later time. However, one major disadvantage is that a clearing house in the bulk mode cannot act as an SAB. Furthermore, the clearing house cannot make any routing decisions because this can likewise be done only in the online mode. The most important components of an OSP message are the pricing exchange, authorization exchange and usage exchange. Pricing exchange comprises the interchange of information for the costs of a telephone call. This pricing exchange comprises the transmission of a pricing indication, which must be confirmed by a pricing confirmation. The authorization exchange is carried out when resources are intended to be used by the clearing house. This normally corresponds to an authorization for setting up a telephone call. Like the pricing exchange, the authorization exchange is based on the transmission of an authorization request, which is confirmed with an authorization response. The usage exchange includes a description of the resources used. A usage indication is transmitted for this purpose, and is confirmed by a usage confirmation. Since the OSP can still not distinguish between services, the expression usage should be understood as meaning the call time for a telephone call that has been made.

IP-based telephony and video telephony in the prior art are, however, associated with considerable disadvantages. Although it is now possible to authenticate the call subscribers in an IP-based network by means of described authentication and authorization mechanisms, their authorization for specific services must be checked. However, these authentication and authorization methods are rather cumbersome and, furthermore, do not comply with the stringent standards relating to security, billing and service authorization that are required in conventional telephony networks. In particular, GSM/UMTS mobile radio networks in this context offer authentication and authorization standards which cannot be implemented in an IP-based network, because of its intrinsic characteristics. This is because the open architecture of the IP protocol lacks a large number of information items which are absolutely essentially required for full compatibility with GSM networks.

One object of the invention is thus to propose a novel and better method as well as a system for IP-based telephony and/or video telephony. In particular, this novel and better method and system are intended to allow the users of IP-based telephony and/or video telephony to be provided with the same standards relating to registration, authentication and authorization as those which they have become used to from conventional telephony, for example from GSM mobile radio telephony.

According to the present invention these aims are achieved in particular by the elements in the characterizing part of the independent claims. Further advantageous embodiments are also specified in the dependent claims and in the description.

In particular, these aims are achieved by the invention in that at least one IP node and a second terminal (with the IP node being authenticated in the IP-based network and being registered in a location databank) has authentication data transmitted to it from an identification module of the IP node as well as registration data from the IP node to a registration module, with the registration module separating the authentication data from the registration data and passing it to an authentication module, with the IP node being authenticated on the basis of the authentication data by means of the authentication module and by means of a home location register, with a location update being carried out in the home location register if the authentication of the IP node is successful, and with corresponding localization data being transmitted to the registration module, and with the localization data of the IP node being stored in the location databank by means of the registration module, and corresponding data being passed to the identification module of the IP node, and with the IP node being released for IP-based telephony and video conferencing. Inter alia, this has the advantage that secure and convenient authentication and/or authorization of the users become/becomes possible in an IP-based telephony and/or video telephony network. The link between IP-based telephony and/or video telephony and the convenient and secure method allows highly protected and proven authentication and/or authorization of the users, as is known from GSM mobile radio telephony.

In one embodiment variant, authentication data is used which complies with the GSM Standard. This embodiment variant inter alia has the advantage that an existing GSM infrastructure of a provider can be used without major modifications. In this case, user profiles are created for the users of the IP-based telephony and/or video telephony, in the same way as for users of conventional mobile radio telephony. Furthermore, this allows existing stringent security criteria from GSM technology to be used.

In a further embodiment variant, a SIM card is used as the identification module of the IP node. Inter alia, this has the advantage that a SIM card is a widely used and proven means for identification of IP nodes, in particular mobile IP nodes. This likewise complies with the stringent security standards and, thanks to its small size, can also easily be replaced or transported. Furthermore, the production costs of SIM cards such as these are low in comparison to other similar identification mechanisms.

In yet another embodiment variant, the infrastructure which is used for IP-based telephony and/or video telephony complies with the SIP protocol. Inter alia, this embodiment variant has the advantage that the SIP protocol is a widely used alternative in IP-based telephony and/or video telephony networks. SIP is easy to implement, is based on the HTTP protocol and allows a high degree of flexibility for widely differing applications. Many products which support the SIP protocol are likewise already commercially available, now.

In a further embodiment variant, the authentication data is transmitted from the IP node to the registration module via a non-contacting interface. This embodiment variant has the advantage, inter alia, that mobile IP nodes can be used, and this allows greater mobility of the users of IP-based telephony and/or mobile telephony, in comparison with mobile radio telephony.

In a further embodiment variant, the authentication data is transmitted from the IP node to the registration module via a WLAN 802.11 and/or a Bluetooth and/or GSM and/or UMTS interface. This has the advantage that known and established networks can be used for the transmission of authentication data, so that existing facilities (hotspots) can be used.

In yet another embodiment variant, an IP-compatible mobile radio telephone is used as the IP node. This embodiment variant has the advantage that IP-based telephony and/or video telephony can be used additionally or as a replacement for conventional mobile radio telephony without the user having to buy another appliance for this purpose.

In a further embodiment variant, call detail records of the IP node are transmitted to the registration module, with the registration module recording at least the identity of the IP node and/or the time duration and/or the provider of the demanded service, and passing this to a billing module, and the billing module produces billing files, corresponding to the demanded service, based on the billing data of the registration module and the first call detail records, and transmits these with invoicing instructions to a clearing module. Inter alia, this has the advantage that the billing for the services used can be handled more easily via a clearing module, particularly in the case of clearing between the various network operators.

At this point, it should be stated that the present invention relates not only to the method according to the invention but also to a system for carrying out this method.

Embodiment variants of the present invention will be described in the following text with reference to examples. The examples of the embodiments are illustrated by the following attached figures:

FIG. 1 shows a block diagram which schematically illustrates a method and a system for IP-based telephony and/or video telephony according to the prior art. In this case, the IP nodes 30 access the infrastructure for IP-based telephony and/or video telephony 50 via a data network 100. This infrastructure for IP-based telephony and/or video telephony 50 includes a registration module 51, a monitoring module 52 and a gateway IP/PSTN 53 by means of which communication is set up to the telephones 31, which are switched via the public switched telephone network 200.

Figure 2:
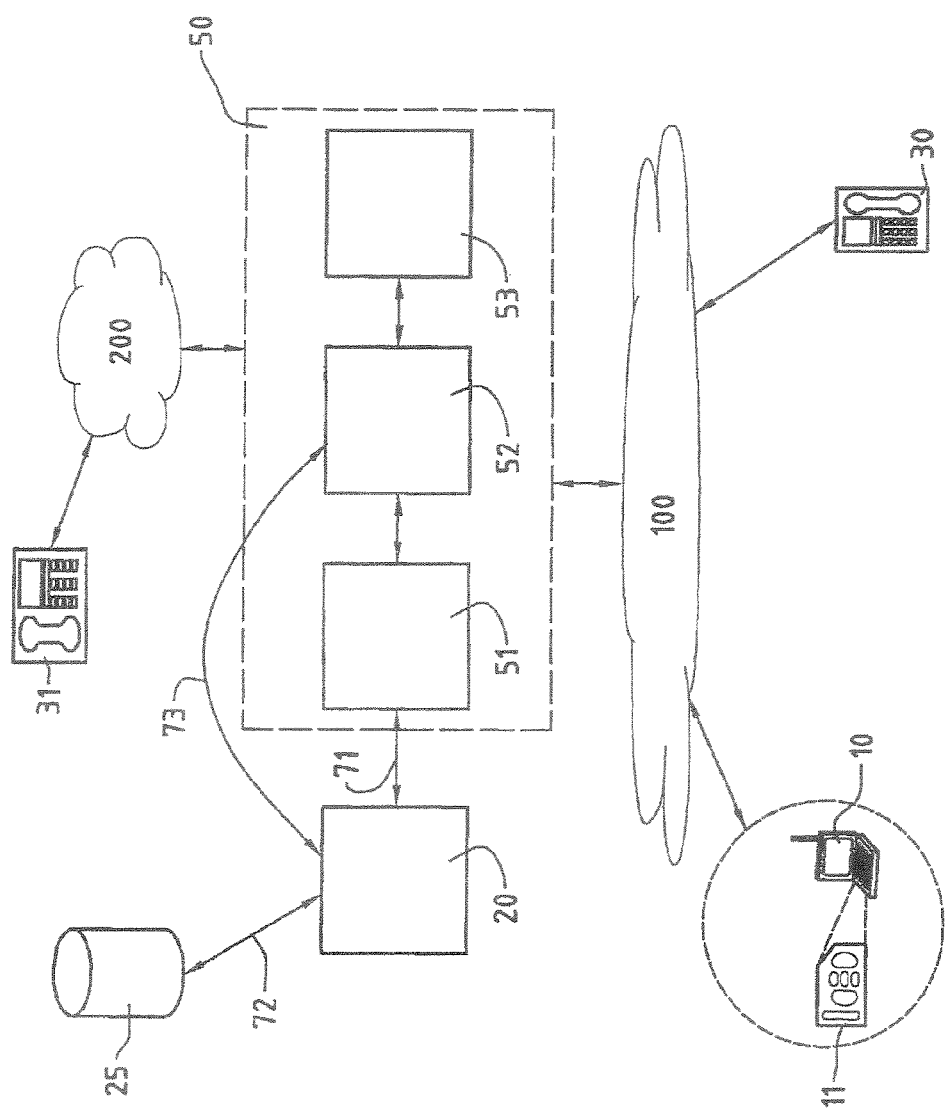

FIG. 2 shows a block diagram which schematically illustrates a method according to the invention and a system according to the invention for IP-based telephony and/or video telephony, in which IP nodes 10 have an identification module 11 and access an infrastructure for IP-based telephony and/or video telephony 50 via a data network 100. This infrastructure for IP-based telephony and/or video telephony 50 has a registration module 51, a monitoring module 52 and a gateway IP/PSTN 53, by means of which communication is set up with the telephones 31 which are switched via the public switched telephone network 200. An authentication module 20 authenticates the IP node 10 on the basis of the authentication data for a home location register 25, with this authentication data being stored in the identification module 11 for the IP node 10.

FIG. 2 illustrates an architecture which can be used for implementation of the invention. In FIG. 2, the reference symbol 10 relates to an IP node which has the necessary infrastructure, including all of the hardware and software components, to implement a described method and/or system according to the invention. The expression IP nodes 10 should be understood as meaning, inter alia, all possible so-called customer premise equipment (CPE), which is intended for use at different network locations and/or with different networks. This includes, for example, IP-based telephony and/or video phones, as well as all other IP-compatible appliances such as PDAs, laptops or mobile radio telephones. The IP nodes 10 have one or more different physical network interfaces, which can also support a plurality of different network standards. These physical network interfaces of the IP node 10 may, for example, include non-contacting interfaces to WLAN (Wireless Local Area Network), Bluetooth, GSM (Global System for Mobile Communication), GPRS (Generalised Packet Radio Service), USSD (Unstructured Supplementary Services Data), EDGE (Enhanced Data Rates for GSM Evolution) or UMTS (Universal Mobile Telecommunications System) etc. However, they may also be physical network interfaces to Ethernet, Token Ring or to another wired LAN (Local Area Network). The reference symbol 100 correspondingly represents the various networks, for example a wireless LAN (based on IEEE 802.1x), a Bluetooth network, a wired LAN (Ethernet or Token Ring), or else a mobile radio network (GSM, UMTS, etc.) or a PSTN network. The physical network interfaces of the IP node 10 may be not only packet-switched interfaces, such as those which are used directly by network protocols, but also circuit-switched interfaces, which can be used by means of protocols such as PPP (Point to Point Protocol), SLIP (Serial Line Internet Protocol) or GPRS (Generalised Packet Radio Service) for data transfer.

Furthermore, the IP node 10 has an identification module 11. This identification module 11 may be in the form of hardware or software and may be connected via a contacting or non-contacting interface to the IP node 10, or may be integrated in the IP node 10. In particular, the identification module 11 may be in the form of a SIM card, as is known from mobile radio telephones. This identification module 11 includes, inter alia, the authentication data which is relevant for authentication of the IP node 10 in an IP-based network for telephony and/or video telephony. This authentication data may in particular include an IMSI (International Mobile Subscriber Identifier) and/or TMSI (Temporary Mobile Subscriber Identifier) and/or LAI (Location Area Identity) etc. complying with the GSM Standard.

In order to register the IP node 10 in the network for IP-based telephony and/or video telephony, the IP node 10 uses a contacting or non-contacting interface to the IP-based network 100 to request access to the telephony and/or video telephony service. As already described, the IP-based network 100 may comprise various network standards and protocols, such as wire-free networks WLAN 802.11 or Bluetooth, or else cable networks such as Ethernet or Token Ring etc. The infrastructure for IP-based telephony and/or video telephony 50 comprises a registration module 51, a monitoring module 52 and a gateway 53, which ensures the link between the IP-based network 100 and the public switched telephony network (PSTN) 200 and/or mobile radio network. This infrastructure may be designed in accordance with the requirements of the SIP (Session Initiation Protocol) and/or H.323 and/or MGCP (Media Gateway Control Protocol) and/or MEGACO protocol (Media Gateway Control) for IP-based telephony and/or video telephony. A registration request includes the authentication data from the identification module 11 for the IP node 10 and registration data for registration in the IP-based telephony and/or video telephony network. In particular, the authentication data may include IMSI from a GSM-based SIM card. This registration request is transmitted to the registration module 51 for the IP-based telephony and/or video telephony network, for example to an SIP register. The authentication data is separated from the registration data by the registration module 51, and is transmitted to an authentication module 20. On the basis of the authentication data, the authentication module 20 generates the required authentication and/or authorization and/or configuration functions, so that the authentication module 20 carries out the authentication and/or authorization of the IP node 10 on the basis of the authentication data from the identification module 11 for the IP node 10, in the case of a home location register (HLR) 25. This home location register 25 may, in particular, be a home location register (HLR) of a GSM network, which includes appropriate user profiles. It is also feasible for the IMSI to be used by the identification module 11 of the IP node 10 just for one or more of the steps in the authentication process for the IP node 10 while the IMSI is replaced by a generated temporary IMSI (referred to as TMSI) in all the other authentication steps.

In particular, the following challenge-response method may be used for the authentication method. As the challenge (question), the identification module 11 (for example the SIM card) receives a 128-bit random number (RAND). A confidential algorithm which is specific to the respective operator is then run on the identification module 11, receiving as an input the random number RAND and a secret key Ki, which is stored in the identification module 11, from which it generates a 32-bit response (SRES) and a 64-bit key Kc. Kc is used for encryption of the data transfer via wire-free interfaces (GSM Technical Specification GSM 03.20 (ETS 300 534): "Digital cellular telecommunication system (Phase 2); Security related network functions", European Telecommunications Standard Institute, August 1997). A plurality of RAND challenges for generation of a plurality of 64-bit Kc keys are used for authentication. These Kc keys are combined to form a longer session key. At the start of the authentication process, the IP node 10 transmits the International Mobile Subscriber Identity (IMSI), of the user from the identification module 11 to the registration module 51. With the IMSI, the registration module 51 receives 25 n GSM triplets in response to a triplet request from the corresponding HLR. The registration module 51 uses the triplets to calculate MAC_RAND and the session key K. The calculation of the cryptographic values of the SIM-generated session key K and of the message authentication codes MAC_RAND and MAC_SRES could, for example, be taken from the document "HMAC: Keyed-hashing for Message Authentication" by H. Krawczyk, M. Bellar and R. Canetti (RFC2104, February 1997). After this, the GSM authentication algorithm is run on the identification module 11 for the IP node 10, and calculates a copy of MAC_RAND. The IP node 10 checks that the calculated value of MAC_RAND is the same as the received value of MAC_RAND. If the two values do not match, the IP node 10 terminates the authentication process and does not send any authentication values, calculated by the identification module 11, back to the network. Since the value RAND is received together with the message authentication code MAC_RAND the IP node 10 can ensure that RAND is new and has been generated by the network. If the authentication process is successful, a location update is carried out in the HLR 25, and the IP node 10 receives an appropriate entry in a customer database of the access server.

Once the authentication and/or authorization processes have been carried out in the home location register 25, the corresponding localization data is transmitted from the authentication module 20 to the registration module 51. The registration module 51 is used to store the localization data in a databank with information relating to the IP nodes 10 in the IP-based telephony and/or video telephony network. In particular, this localization data may include an IP address, MAC address and further relevant data for IP-based telephony and/or video telephony. In addition to the authentication in the IP-based telephony and/or video telephony network, the call detail records for the IP node 10 are transmitted to the registration module 51, with the registration module 51 recording at least the identity of the IP node 10 and/or the time duration and/or the provider of the service being used, and passing this to a billing module, and with the billing module producing billing files, corresponding to the service used, on the basis of the billing detail of the registration module 51 and the first call data records, and transmitting these with invoicing instructions to a clearing module. The registration module 51 then transmits corresponding authentication data to the identification module 51 of the IP node 10, and stores this, thus releasing the IP node 10 for IP-based telephony and/or video telephony.

The invention claimed is:

1. A method for IP-based communication between an IP node and a second terminal, the IP node being authenticated in an IP-based communication network and being registered in a location databank, with a connection between the IP-based communication network and a publicly switched telephony network or mobile radio network being created and administered by a central connection administration module of the IP-based communication network for IP-based voice telephony or image telephony, the central connection administration module including a Session Initiation Protocol (SIP) registration module, a monitoring module, and a gateway module, the method comprising:

transmitting a registration request, including registration data of the IP node and authentication data of an identification module of the IP node, from the IP node to the SIP registration module of the central connection administration module, the registration data including data to register with the IP-based voice telephony or image telephony, the registration data and the authentication data being of the same IP node and being transmitted from the same IP node, and the IP node being authenticated in the IP-based communication network and being registered in the location databank;

extracting the authentication data from the registration request and passing the authentication data to an authentication module via the SIP registration module;

authenticating the IP node based on the authentication data by the authentication module and by a home location register in a GSM network, the authenticating being performed by the authentication module in the IP-based communication network directly accessing the home location register in the GSM network;

carrying out a location update, when the authentication of the IP node is successful, in the home location register;

transmitting localization data to the SIP registration module;

storing the localization data of the IP node in a location databank via the SIP registration module; and passing corresponding data to the identification module of the IP node, with the IP node being released for the IP-based voice telephony or image telephony.

2. The method as claimed in claim 1, wherein the authentication data complies with the GSM standard.

3. The method as claimed in claim 1, wherein the identification module of the IP node is a SIM (Subscriber Identification Module) card.

4. The method as claimed in claim 1, wherein at least one of the IP-based telephony and image telephony is SIP-compatible.

5. The method as claimed in claim 1, wherein the authentication data and the registration data are transmitted from the IP node to the SIP registration module via a wireless interface.

6. The method as claimed in claim 1, wherein the authentication data and the registration data are transmitted from the IP node to the SIP registration module via at least one of WLAN 802.11 interface, Bluetooth, GSM, and UMTS interface.

7. The method as claimed in claim 1, wherein the IP node is an IP-compatible mobile radio telephone.

8. The method as claimed in claim 1, further comprising the steps of:

transmitting call detail records of the IP node to the SIP registration module;

recording at the SIP registration module at least one of the identity of the IP node, time duration, and a provider of a demanded service;

passing the call detail records to a billing module, the billing module generating billing files, corresponding to the demanded service, based on billing data of the SIP registration module and the call detail records; and transmitting the billing files with invoicing instructions to a clearing module.

9. The method as claimed in claim 1, wherein the localization data of the IP node includes an IP address and a MAC address.

10. A system for at least one of IP-based voice telephony and image telephony between an IP node authenticated in the IP-based communication network and registered in a location databank, and a second terminal, the system comprising:

a transmission unit that transmits a registration request from the IP node to a Session Initiation Protocol (SIP) registration module of a central connection administration module of the IP-based communication network for the at least one of IP-based voice telephony and image telephony, the registration request including registration data of the IP node and authentication data of an identification module of the IP node, the registration data including data to register with the at least one of IP-based voice telephony or image telephony, the registration data and the authentication data being of the same IP node and being transmitted from the same IP node, and the IP node being authenticated in the IP-based communication network and being registered in the location databank,
wherein
    the central connection administration module further includes a monitoring module and a gateway module, by which the connection between the IP-based network and a publicly switched telephony network or mobile radio network can be created and administered,
    the identification module of the IP node stores the authentication data and transmits the authentication data from the IP node to the SIP registration module,
    the SIP registration module extracts the authentication data from the registration request and forwards the authentication data to an authentication module,
    the authentication module authenticates the IP node for a home location register in a GSM network based on the authentication data, and transmits corresponding localization data to the SIP registration module, the authentication module in the IP-based communication network directly accessing the home location register in the GSM network, and
    the SIP registration module stores the localization data of the IP node in a location databank, and passes corresponding data to the identification module of the IP node.

11. The system as claimed in claim 10, wherein the authentication data complies with the GSM Standard.

12. The system as claimed in claim 10, wherein the identification module of the IP node is a SIM (Subscriber Identification Module) card.

13. The system as claimed in claim 10, wherein the at least one of IP-based voice telephony and image telephony is SIP-compatible.

14. The system as claimed in claim 10, wherein the authentication data and the registration data are transmitted from the IP node to the SIP registration module via a non-contacting interface.

15. The system as claimed in claim 10, wherein the authentication data and the registration data are transmitted from the IP node to the SIP registration module via at least one of a WLAN 802.11 interface, Bluetooth interface, GSM interface, and UMTS interface.

16. The system as claimed in claim 10, wherein the IP node is an IP-compatible mobile radio telephone.

17. The method as claimed in claim 1, further comprising transmitting a second registration request, including registration data of a second IP node and authentication data of an identification module of the second IP node, from the second IP node to the SIP registration module, the authentication data of the identification module of the second IP node being different from the authentication data of the identification module of the IP node.

* * * * *